Patented Oct. 31, 1922.

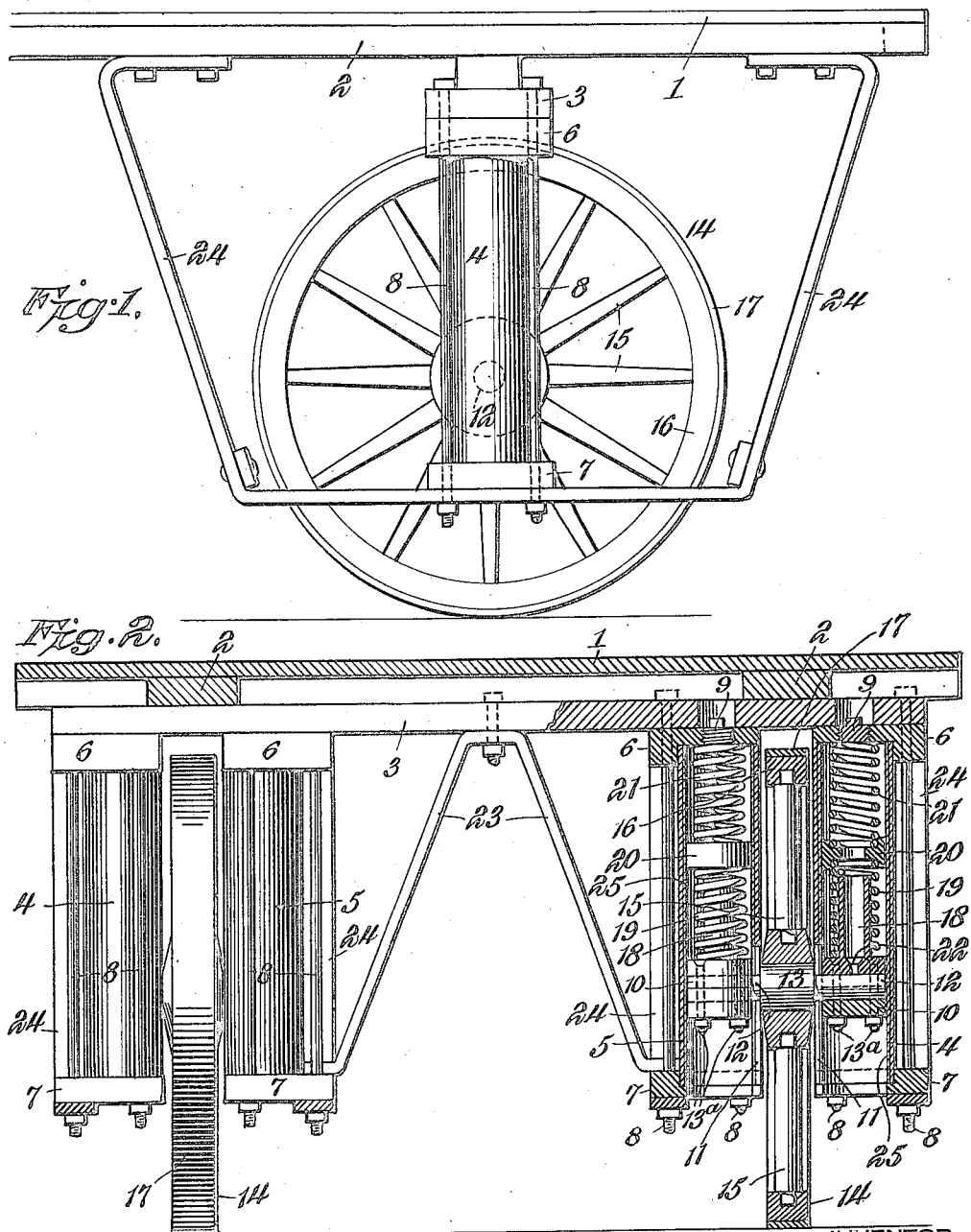

1,434,137

UNITED STATES PATENT OFFICE.

ARTHUR MILLS, OF SACRAMENTO, CALIFORNIA.

TRAILER WHEEL FOR MOTOR TRUCKS.

Application filed September 9, 1919. Serial No. 322,738.

*To all whom it may concern:*

Be it known that I, ARTHUR MILLS, a citizen of the United States, residing at Sacramento, in the county of Sacramento and State of California, have invented a new and useful Trailer Wheel for Motor Trucks, of which the following is a specification.

This invention has reference to trailer wheels for motor trucks, or for other purposes, and its object is to provide a wheel mounting, whereby each wheel, whether the vehicle be a two wheel vehicle or a four wheel vehicle, is entirely independent of the other wheel or wheels.
The invention comprises a spring mounting for each wheel individual thereto, permitting up and down movements of the body on the wheel so that the vehicle will carry perishable freight over rough roads, as, for instance, fruit, berries, soft vegetables like tomatoes, and other similar commodities, and deliver the same in good condition. The trailer has the advantage of following the same tracks as the power machine drawing it. Furthermore, the construction of the invention permits the lowering of the first cost and the upkeep whereby the trailer is capable of manufacture and maintenance at low cost.
Each wheel is mounted on a floating axle construction so that the separate wheels readily accommodate themselves to unevenneses in the roadway without any movement, or only a very slight movement of the body of the trailer.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

In the drawing:—

Figure 1 is a side elevation of one of the wheel mountings with a small portion of the body of the trailer shown.

Figure 2 is a cross section through the body or platform of the trailer showing two wheels side by side, one wheel being in elevation and the other in section.

Referring to the drawing, there is shown a platform 1, supported by sills 2 or otherwise, and which may be taken as representative of a trailer body of any suitable construction. In the case of a two wheel vehicle there is also provided a cross beam 3 which may be duplicated in the case of a four wheel vehicle, but as the construction of the invention may be substantially the same in both two and four wheel vehicles, a description of one set of wheels will answer for both sets of wheels. On opposite sides of the mid-point of the beam 3 are tubular cylindrical guides 4, 5, arranged in pairs, with the guides of each pair spaced apart by an appropriate distance. The cylinders which form the guides are open at each end. Each guide is provided with caps 6, 7 at opposite ends held together by bolts 8 traversing them so that the guides are appropriately braced. The caps at the upper ends of the guides partly close the cylinders are themselves closed by screw plugs 9 or in other appropriate manner, accessible through the beam 3 so that the plugs may be placed or removed at will. The bottom caps 7 surround but do not close the guides. Within each tubular guide 4 and 5 is a block or head 10 so arranged as to fit snugly yet slide freely in the guide. Extending for a distance from the lower end of each guide through the wall thereof toward the other end of the guide is a longitudinal slot 11 traversed by a rod or shaft 12 mounted in the respective head 10. Each head may be made of two or more sections fastened together by bolts 13ª or in other manner to constitute separable journal bearings for the rod 12, which latter is made fast in a hub 13 constituting the hub of a wheel 14 of any suitable construction. In the drawing the wheel is shown as made up of spokes 15, a felly 16 and a rim or tire 17, which latter may be a metallic tire, or a solid rubber tire, or other suitable form of tire.

Each head 10 carries a hollow guide pin 18 for a spring 19 engaging the head 10 at one end and at the other end engaged by a follower block 20. Between the block 20 and the head 6 of each guide there is lodged another spring 21. The head 10 is provided with an oil passage or hole 22 communicating with the guide pin 18. The arrangement is such that from time to time each plug 9 may be removed and lubricant be introduced into the guide sleeve 4 or 5, as the case may be, this lubricant readily finding its way through the spring 21, follower 20, guide pin 18, and by way of the oil passage or hole 22 to the rod or axle 12 which is fast to the heads 10, thereby lubricating them.

The follower 20 moves in its tube to a certain extent independently of either of the coil springs. In other words, each follower 20 floats between the two springs but is not permanently attached to either. The vibrations of the lower springs 19 are transmitted through the follower to the upper spring 21, which will cushion or deaden said vibrations. The entire independence of the two coil springs housed in the tube makes the wheel mounting a very much easier riding one than if only a single coil spring were used in each tube. The wheel mounting of the present invention is particularly adapted for trailers which are usually light vehicles and which are more easily jolted while traversing roads. The double spring follower construction provides a resilient suspension for the wheel which makes it possible to load ripe fruits and vegetables upon the trailer and deliver the same in good condition after travel over rough roads.

The sides of the hub 13 may be made partially flat so as to steady the wheel between the guides 4 and 5 and relieve the heads 10 to a certain extent of side strains. To aid in stiffening the wheel structure the tubular guides 5 are made fast to a brace bar 23, in turn made fast to the beam 3. When the trailer is moving along the ground the wheels are sustained solely by the springs 19 and 21, these springs being arranged on opposite sides of each wheel so that the wheel is balanced by the springs. The wheels are wholly independent of each other having no connection whatever from wheel to wheel. When a motor vehicle is traveling along a roadway with a trailer, embodying the invention, being drawn by the motor vehicle, the trailer will follow in the tracks of the main vehicle. Should, however, the trailer meet small obstructions or the wheels move into ruts each wheel will give in an up and down direction without causing the vehicle to tip in the manner which occurs with wheels joined by axles. Consequently there is less liability of the vehicle upsetting than with vehicles having axles, and the load may be piled higher than usual on the vehicle without rendering it unstable. Fragile or easily damaged commodities can be transported with but small liability of damage on account of the floating mounting of the body on the wheels and the total independence of the wheels with respect to each other.

In addition to the braces 23 other braces 24 connecting the tubular guides 4 and 5 with the sills 2 or parts carried thereby may be employed. Since the heads or blocks 10 and the followers 20 have more or less play in the guides, each guide is provided with a lining 25 of Babbitt metal or other suitable material.

What is claimed is:—

1. A wheel structure and mounting for vehicles, comprising a pair of juxtaposed tubular guides spaced apart crosswise of the vehicle, a wheel movable in the space between the guides, heads slidably mounted in the guides, a rod mounted in the heads and bridging the space between the guides and serving as an axle for the wheel, each head having a lubricant passage leading to the axle, a hollow guiding pin erected on the head in such position that the bore of the pin joins said lubricant passage, a coil spring surrounding the pin and extending above the latter and resisting upward movement of the head within the guide, and means whereby lubricant may be fed through the spring, hollow pin and passage to the rod constituting the axle.

2. A wheel structure and mounting for vehicles, comprising a pair of juxtaposed tubular guides spaced apart crosswise of the vehicle, a wheel received within the space between the guides, heads slidably received within the guides, a rod mounted in the heads and bridging the space between the guides, a wheel mounted on the rod, coil springs in each of the guides above the head, each head having a lubricant passage leading to the rod, a hollow guiding pin provided on each head with its bore joining the lubricant passage, one of the springs in each guide surrounding said hollow pin, a follower in each guide having a central passageway and mounted between the coil springs, a removable plug in the upper end of the guide, said plug when removed permitting the introduction of lubricant for the axle, with the lubricant passing through the coil springs and central passageway in the follower and through the hollow pin and lubricant passage in the head.

3. A vehicle wheel mounting comprising a pair of parallel guides in the form of cylinders, said guides being closed at their upper ends but open at the lower ends, a head slidable within each guide, a slot provided in each guide and extending from the lower end upwardly, a rod constituting a wheel axle journaled at its ends in each head and slidable in said slots, and springs interposed between the closed upper end of the guides and the heads, whereby the weight of the vehicle is sustained by compression of said springs, a follower slidably received within each guide and located above the head, one spring being interposed between the follower and head and a second spring being interposed between the follower and the upper end of the guide.

4. A wheel mounting comprising an axle, a head receiving one end of said axle and serving as a journal therefor, a cylindrical guide slidably receiving said head, a pin joined to said guide, a coil spring surrounding the pin and of a length greater than the pin, a follower slidable within the guide and seating the upper end of said coil spring, a second coil spring having its lower end seated upon the upper side of the follower and bearing against the upper end of the guide, the follower moving independently of the head, the head moving without resistance downwardly within the guide.

5. A vehicle having a plurality of independently mounted wheels, each wheel mounting comprising a pair of cylindrical parallel guides, heads slidable in the guides, a rod journaled in the heads and constituting the wheel axle, springs interposed between the upper ends of the guides and the heads, caps at each end of each guide, bolts passing through each pair of caps and uniting the wheel mounting to the vehicle, a brace bar extending transversely of the vehicle and united thereto between each pair of wheel mountings and also united at its ends to the fixed parts of each wheel mounting of said bar, a pair of braces extending longitudinally of the vehicle and joined thereto and to the lower fixed part of each wheel mounting, all of said braces being wholly disconnected from any of the movable parts of said wheel mounting whereby every wheel is individually mounted with respect to the vehicle and exerts no influence in moving the other wheel.

In testimony, that I claim the foregoing as my own I have hereto affixed my signature.

ARTHUR MILLS.